US008207971B1

(12) United States Patent
Koperwas et al.

(10) Patent No.: US 8,207,971 B1

(45) Date of Patent: Jun. 26, 2012

(54) CONTROLLING ANIMATED CHARACTER EXPRESSIONS

(75) Inventors: Michael Koperwas, San Francisco, CA (US); Frederic P. Pighin, Sausalito, CA (US); Cary Phillips, Moss Beach, CA (US); Steve Sullivan, San Francisco, CA (US); Eduardo Hueso, Plantation, FL (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 702 days.

(21) Appl. No.: 12/388,806

(22) Filed: Feb. 19, 2009

Related U.S. Application Data

(60) Provisional application No. 61/141,778, filed on Dec. 31, 2008.

(51) Int. Cl.
*G06T 15/00* (2011.01)

(52) U.S. Cl. ........ 345/473; 345/474; 345/475; 382/118; 715/203

(58) Field of Classification Search .................. 345/420, 345/473, 474, 475; 382/118; 715/203
See application file for complete search history.

(56) References Cited

U.S. PATENT DOCUMENTS

| | | | | |
|---|---|---|---|---|
| 5,111,409 | A * | 5/1992 | Gasper et al. ................ | 715/203 |
| 6,876,364 | B2 * | 4/2005 | Buddemeier et al. ......... | 345/473 |
| 7,209,577 | B2 * | 4/2007 | McAlpine et al. ........... | 382/118 |

OTHER PUBLICATIONS

J.P. Lewis, et al. "Reducing Blendshape Interference by Selected Motion Attenuation.", Proceedings of the 2005 Symposium on Interactive 3D Graphics and Games (I3D '05), 2005, 5 pages.

* cited by examiner

*Primary Examiner* — Phu Nguyen
(74) *Attorney, Agent, or Firm* — Fish & Richardson P.C.

(57) ABSTRACT

A system includes a computer system capable of representing one or more animated characters. The computer system includes a blendshape manager that combines multiple blendshapes to produce the animated character. The computer system also includes an expression manager to respectively adjust one or more control parameters associated with each of the plurality of blendshapes for adjusting an expression of the animated character. The computer system also includes a corrective element manager that applies one or more corrective elements to the combined blendshapes based upon at least one of the control parameters. The one or more applied corrective elements are adjustable based upon one or more of the control parameters absent the introduction of one or more additional control parameters.

43 Claims, 9 Drawing Sheets

200

Corrective Shape

300

=

302

304

CONTROLLING ANIMATED CHARACTER EXPRESSIONS

CLAIM OF PRIORITY

This application claims priority under 35 USC §119(e) to U.S. Patent Application Ser. No. 61/141,778, filed on Dec. 31, 2008, the entire contents of which are hereby incorporated by reference.

TECHNICAL FIELD

This document relates to controlling and adjusting expressions of animated characters.

BACKGROUND

Parametric models may be generated by a computer for producing animated characters with user-adjustable facial expressions. To simulate the appearance of muscle movement in a character's face, one or more types of models may be implemented. For one model, a character's face may be represented with a collection of contour lines and vertices. Dependent upon the desired level of resolution, an extremely large number of vertices (e.g., tens of thousands, millions, etc.) may be included in the model. By adjusting the position of the vertices, various facial expressions may be represented on the character face. For some facial expressions, relatively few vertex position adjustments are needed while significant adjustments may needed to for representing other facial expressions.

In some implementations, each facial expression is attained from a linear combination of a selected set of facial expressions (referred to as blendshapes). By adjusting one or more parameters associated with the linear combination, a range of facial expressions can be created while utilizing relatively small amounts of computational resources. For each blendshape, a deformable surface that represents the animated character's face may be divided into distinct shapes with non-intersecting boundaries. As such, adjacent shapes that can represent muscular movements tend not to interfere since the shapes do not overlap, however, the range of producible facial expressions that may be limited.

SUMMARY

The systems and techniques described here relate to using corrective shapes to control facial expressions of animated characters.

In one aspect, a computer-implemented method includes combining two or more blendshapes of an animated character, in which each blendshape is capable of being respectively adjusted by a control parameter. The method also includes applying one or more corrective elements to the combined blendshapes based upon at least one the control parameters.

Implementations may include any or all of the following features. Applying one or more corrective elements may include producing a corrective element to adjust the combined blendshapes. For example, the applied corrective element may adjust the geometry of the animated character. Applying a corrective element may include adjusting a non-geometrical feature of the animated character. Applying a corrective element may also returning the animated character to a predefined facial expression. Corrective elements may be applied to independent features of the combined blendshapes. Multiple corrective elements may be applied to the combined blendshapes, based upon one or more of the control parameters of the blendshapes. Multiple corrective elements may also return the animated character to a predefined facial expression. The values of one control parameter may be representative of a range of facial expressions of the animated character, a range of muscular movements of the animated character, a range of simulated movements of a surface of the animated character, a range of movements of one or more joints of the animated character, and the like. Application of the corrective element to the combined blendshapes may also be based on user input.

In another aspect, a system includes an expression manager for respectively adjusting control parameters of blendshapes to adjust an expression of an animated character. The system also includes a blendshape manager for combining two or more blendshapes of the animated character. The system further includes a corrective element manager for applying at least one corrective element to the combined blendshapes based upon at least one of the control parameters.

In another aspect, a computer program product tangibly embodied in an information carrier and comprising instructions that when executed by a processor perform a method that include combining two or more blendshapes of an animated character. At least one control parameter is capable of adjusting each blendshape. The method also includes applying one or more corrective elements to the combined blendshapes based upon at least one of the control parameters.

In another aspect, a system includes a computer system capable of representing one or more animated characters. The computer system includes a blendshape manager that combines multiple blendshapes to produce the animated character. The computer system also includes an expression manager to respectively adjust one or more control parameters associated with each of the blendshapes for adjusting an expression of the animated character. The computer system also includes a corrective element manager that applies one or more corrective elements to the combined blendshapes based upon at least one of the control parameters. The one or more applied corrective elements is adjustable based upon one or more of the control parameters absent the introduction of one or more additional control parameters.

Details of one or more implementations are set forth in the accompanying drawings and the description below. Other features, aspects and advantages will be apparent from the description and drawings, and from the claims.

DESCRIPTION OF DRAWINGS

Like reference symbols in the various drawings indicate like elements.

DETAILED DESCRIPTION

Figure 1:
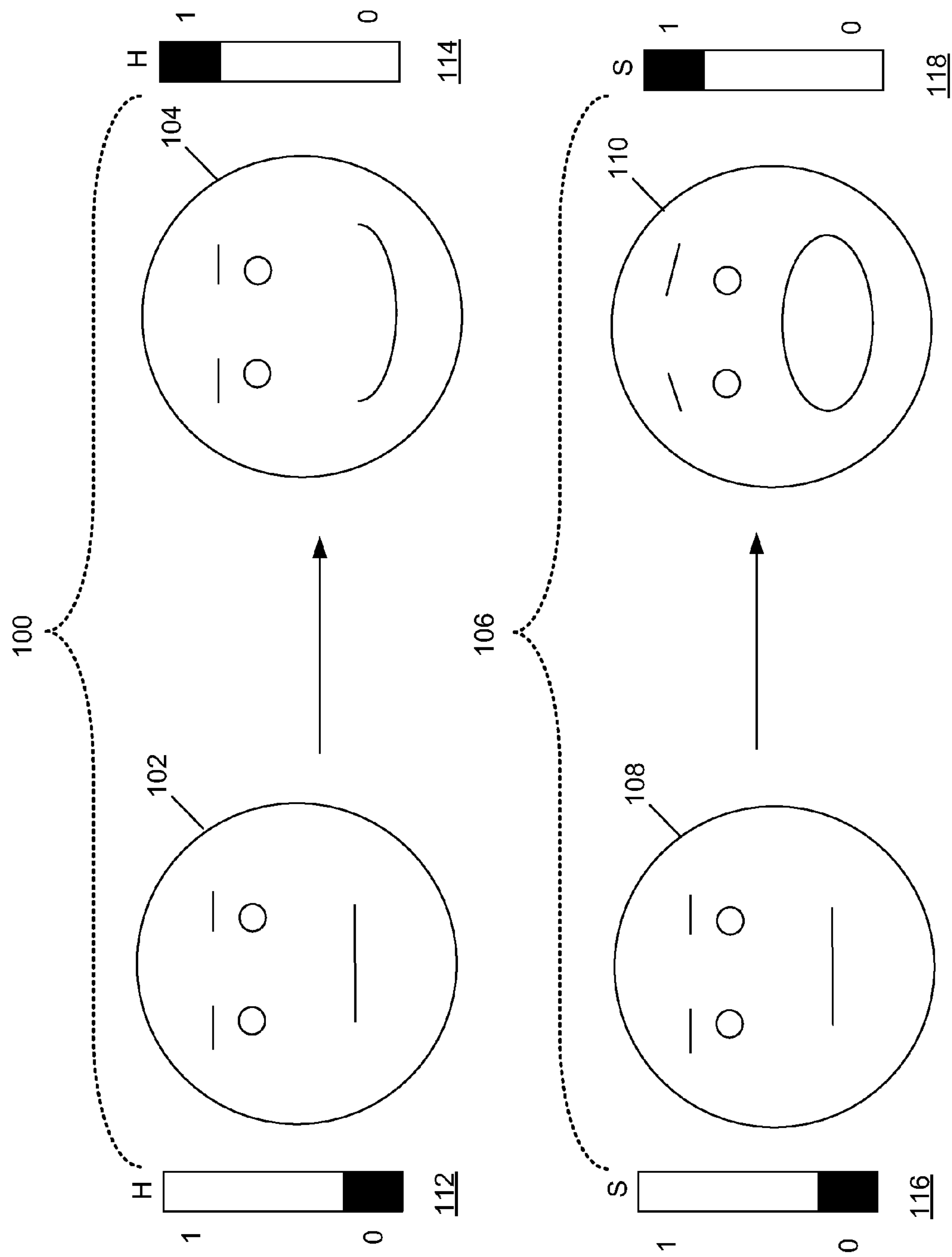
FIG. 1 illustrates exemplary ranges of animated character expressions.

Referring to FIG. 1, facial expressions may be represented by models produced from a linear combination of a selected set of facial expressions (referred to as blendshapes). By adjusting one or more parameters associated with the linear combination, a range of facial expressions can be created while utilizing relatively small amounts of computational resources. For each blendshape, a deformable surface that represents the animated character's face may be divided into distinct geometries with non-intersecting boundaries. For example, two blendshapes are illustrated that are each capable of providing two ranges of facial expressions for a relatively simplistic animated character. Individual expressions may be produced based upon one or more parameters that control the deformable geometries of the blendshapes. In this particular example, one blendshape 100 represents a range of facial expressions that are bounded by a neutral facial expression 102 and an expression 104 of happiness (e.g., a smiling face). Similarly, a second blendshape 106 is capable of producing a range of expressions that are also bounded by a neutral expression 108 (similar to neutral expression 102) and an expression 110 representing an emotion of surprise. In this example, the blendshapes 100, 106 are respectively bounded by a neutral expression and an expression of happiness or surprise, however, in some arrangements other emotions (e.g., sadness, anger, etc.) and bounding expressions may be represented in the blendshapes.

In general, the animated character's face is represented by a collection of vertices (e.g., a mesh) with adjustable positions. For example, the positions of the vertices may be adjusted to illustrate facial expression changes from a neutral position (e.g., facial expression 102) to another facial expression (e.g., facial expression 104). As such, the blendshapes may include information that represents the positional difference of the vertices between one facial expression (e.g., a neutral expression) and another expression (e.g., an expression of an extreme emotion such as happiness). By controlling the vertices positions, the blendshape may be adjusted to produce each of the bounding expressions (e.g., neutral expression 102, expression of happiness 104) and expressions that represent linear interpolations of the bounding expressions. In some arrangements, the effect of a geometrical adjustment on a single vertex is a three-dimensional displacement that is referred to as a delta. As such, a blendshape may be considered as a collection of three-dimensionally displaced vertices or deltas.

One or more techniques may be implemented for producing distinct expressions from the ranges of expressions provided by the blendshapes 100, 106. For example, a control parameter (e.g., a weight) that ranges in value from 0 to 1 may be associated with each blendshape. A weight value of 0 may be assigned to one expression (e.g., the neutral expression 102) located at one limit of the expression range and a weight value of 1 may be assigned to the other limit of the range (e.g., the expression of happiness 104). To illustrate the use of such control parameter values, respective sliders 112, 114, 116 and 118 represent the values assigned to each respective expression. For facial expressions between the two boundary expressions, a weight value between 0 and 1 (e.g., 0.8) may be assigned and set by a corresponding slider. As such, control parameter values may be considered as driving a blendshape to a particular expression. For example, by adjusting a slider (e.g., slider 114) to a particular weight value, a particular expression (e.g., the expression of happiness 104) may be "dialed-up" by a user and rendered on the animated character.

While each of the blendshapes 100 and 106 provides a range of facial expressions, by combining blendshapes, additional expressions may be represented on an animated face of a character. For example, by combining the blendshape 100 (that represents a range expression happiness) with the blendshape 106 (that represents a range of emotions of surprise), additional expressions may be represented. Although, by combining such expressions, the deltas included in one blendshape may not properly combine with corresponding deltas of the other blendshapes, thereby causing unrealistic facial expressions to be produced.

Figure 2:
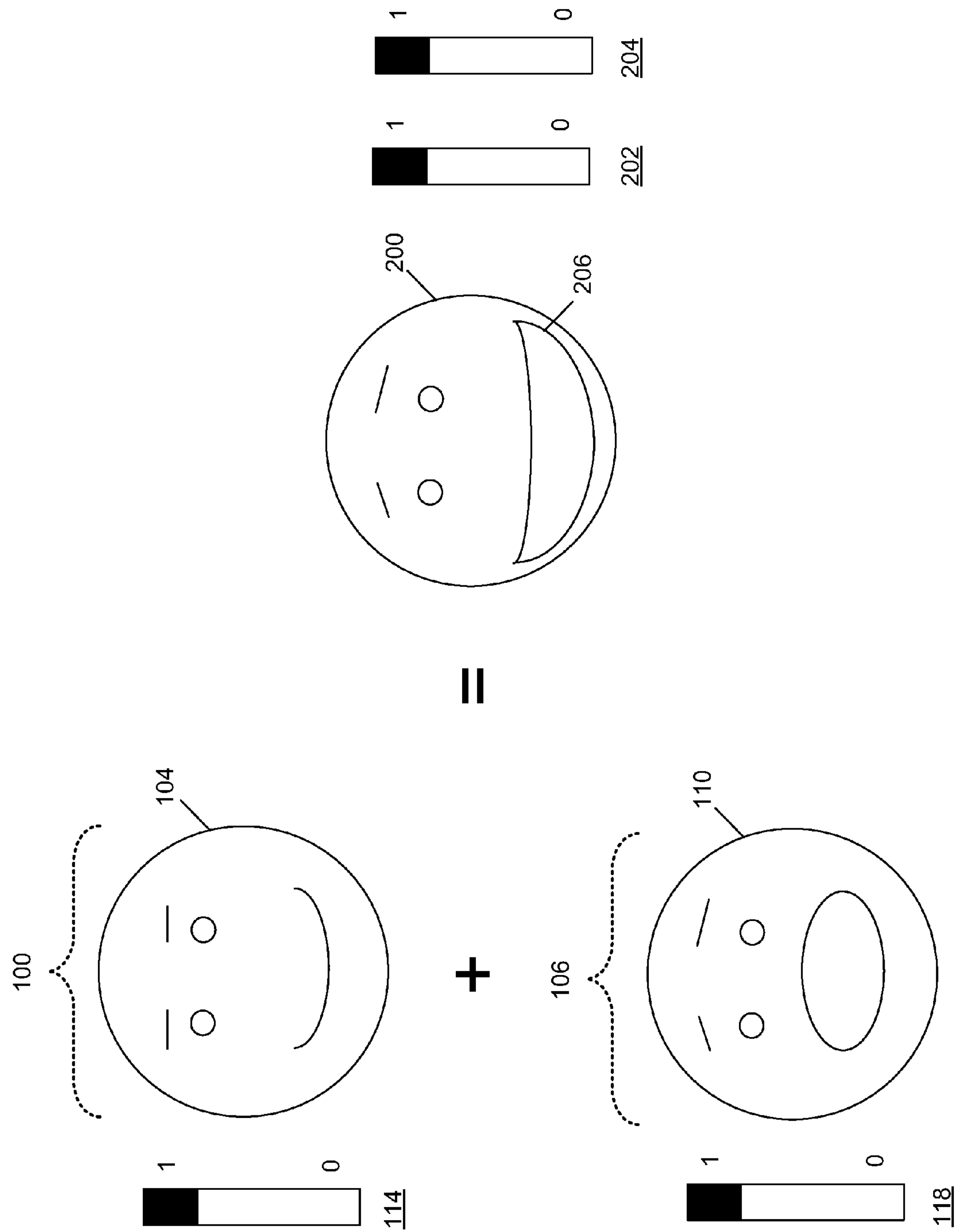
FIG. 2 illustrates interfering shapes.

Referring to FIG. 2, the blendshape 100 (represented by the facial expression 104) is illustrated as being combined with the blendshape 106 (represented by the facial expression 110) to produce a blendshape that includes an expression 200. However, by combining the blendshapes, individual geometries included in the two blendshapes may improperly combine. Facial muscle movements generally correlate across a variety of facial expressions and combining expressions may produce highly irregular muscle representations and unrealistic facial expressions. For example, the facial expression 104 (dialed up with slider 114) is illustrated as being combined with the facial expression 110 (dialed up with slider 118) to produce the expression 200, which represents a maximum level of the happiness being combined a maximum level of surprise (as illustrated with sliders 202 and 204). Due to the correlated geometries included in the two facial expressions 104 and 110, features of the expression 200 appear improperly proportioned. For example, a feature 206 that represents the mouth of the character appears abnormally large with respect to the size of the character's face. As such, one or more facial features of the combined blendshapes may need to be corrected so that a realistic and recognizable expression is produced. For such corrections, one or more corrective elements may be applied to the blendshapes for geometrical and non-geometrical adjustments. For example, one or more geometries (referred to as corrective shapes) may be added to the combined blendshapes to achieve a desired expression. Non-geometrical adjustments, which may be provided by applied corrective elements, may include texture adjustments (e.g., skin texture adjustments), color adjustments (e.g., adjusting skin pigmentation), or other similar types of adjustments. Various types of corrective elements may be provided for geometric and non-geometric adjustments, for example, blendshapes, textures, normal maps, displacement maps, etc. may be implemented.

Figure 3:
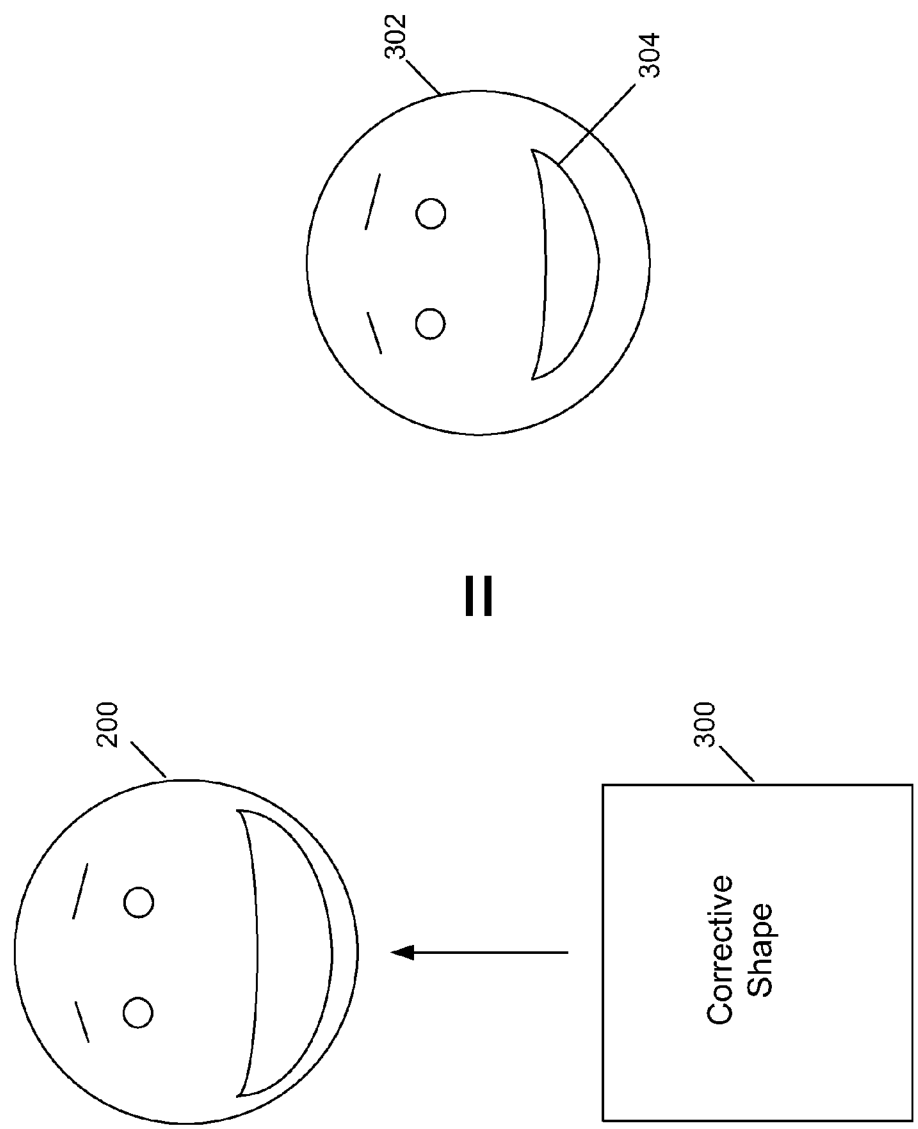
FIG. 3 illustrates use of a corrective element.

Referring to FIG. 3, one type of corrective element, a corrective shape 300, is applied to the combined blendshape that includes the facial expression 200 to produce a realistic facial expression 302 that properly represents a combined expression of happiness and surprise. For example, application of the corrective shape 300 adjusts the expression 200 to reshape one or more facial features (e.g., the character's mouth). One or more techniques may used to define and produce the corrective shape 300. For example, the corrective shape 300 may represent the positional difference of vertices included in the irregular facial expression 200 and vertices of a desired expression. As such, by applying the corrective shape 300 to the expression 200, interference of correlated geometrical movement is substantially removed and, for this example, a corrected facial feature 304 is provided.

Typically, one or more corrective shapes is used to address geometry conflicts for a particular feature or a portion of a feature of a character's face. For example, corrective shapes may be produced for adjusting the corner of a character's mouth, an eyebrow, or other type of facial feature. As such, a large number of corrective shapes may be applied to correct interfering geometries caused by combining blendshapes. For example, to animate a relatively complex character face in which subtle facial variations are needed for a particular performance, an extremely large number of corrective shapes may be needed. Furthermore, applying one corrective shape to correct one facial feature (e.g., the corner of a character's mouth) may interfere with another facial feature (e.g., the upper lip of the character) or even another corrective shape, thereby causing the need for even more corrective shapes.

Similar to dialing up expressions included in a blendshape, a control parameter (e.g., a weight) may be used to adjust the contribution of a corrective shape. As such, as more and more corrective shapes (e.g., hundreds, thousands) are applied to an animated character, the number of control parameters proportionally increase. Correspondingly, a large number of control parameter adjustments may be needed to adjust each corrective shape for each facial expression of a blendshape. Along with possibly requiring a significant amount of modeler time to create and apply the corrective shapes, considerable amount of animator time may be needed for adjusting the corrective shapes to produce the desired character facial expressions for a performance (e.g., a movie, television program, etc.).

Figure 4:
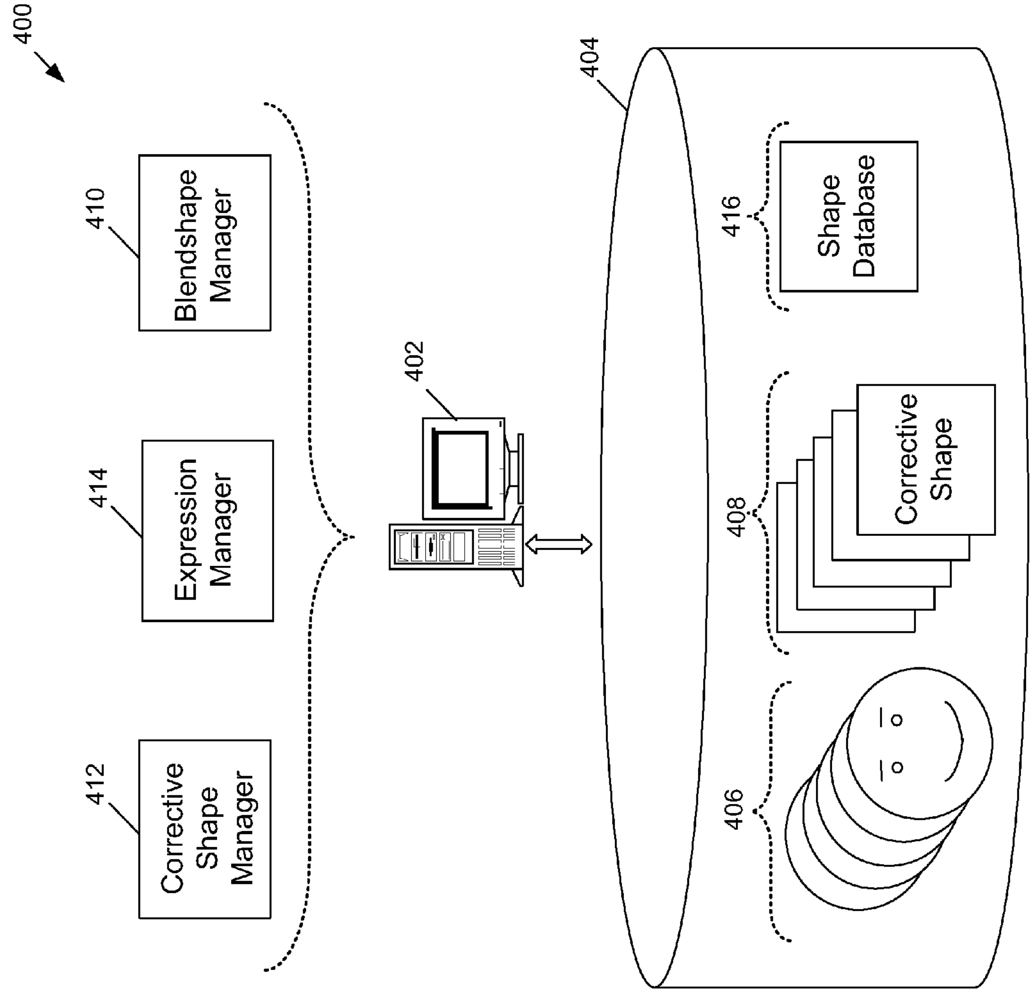
FIG. 4 is a diagram of a character development system.

Referring to FIG. 4, a character development system 400 includes a computer system 402 (or other type of computing device) capable of generating animated characters that use a reduced number of control parameters for adjusting facial expressions of the characters. Along with creating and applying corrective elements (e.g., corrective shapes) to reduce geometry interference, the character development system 400 also drives control parameters of blendshapes and corrective elements in such a manner that less controls parameters need to be adjusted by a user.

Along with components (e.g., interface cards, etc.) for receiving user input (e.g., from a modeler, animator, etc.) and data (e.g., character models) from various sources (e.g., a library of character models, the Internet, other computer systems, etc.), the computer system 402 also includes memory (not shown) and one or more processors (also not shown) to execute processing operations. A storage device 404 (e.g., a hard drive, a CD-ROM, a Redundant Array of Independent Disks (RAID) drive, etc.) is in communication with the computer system 402 and is capable of storing data and providing stored data associated with character generation and character performance production. For example, an illustrative set of blendshapes 406 and corrective shapes 408 are represented as being stored on the storage device 404 and retrievable by the computer system 402 for creating characters and animating performances of the characters. Additional types of geometries and information may also be stored in the storage device 404.

In this arrangement, to incorporate individual blendshapes or combinations of blendshapes into animated characters, a blendshape manager 410 is executed by the computer system 402. In some arrangements, in addition to storing and retrieving blendshapes to and from the storage device 404, the blendshape manager 410 may execute other operations for character development. For example, a modeler may use the blendshape manager 410 for revising previously created characters (e.g., character facial expressions) or create (e.g., electronically sculpt) new character expressions that may be stored in the storage device 404. Automated software packages (e.g., drawing and painting packages, CAD packages, photograph editing packages, etc.) may be used in concert with the blendshape manager 410 to produce such new and revised facial expressions. The blendshape manager 410 also associates one or more control parameters with each blendshape. For example, one or more weights may be assigned to allow dialing up of different expressions that may be provided by a blendshape.

To reduce geometry interference (e.g., caused by combining two or more blendshapes), a corrective shape manager 412 is executed by the computer system 402. Similarly, for non-geometrical adjustments (or geometrical and non-geometrical adjustments), a corrective element manager may be executed. Along with generating corrective shapes to counteract conflicting geometries, the corrective shape manager 412 also associates one or more control parameters with corresponding corrective shapes. For example, one or more variable weights may be assigned to a corrective shape for adjusting its contribution.

For controlling the blendshapes and corrective shapes, and to reduce the number of control parameters that need user interaction, an expression manager 414 is also executed by the computer system 402. By reducing user interaction, less modeler time is needed for producing character models and less animator time is needed for adjusting geometries for a character performance. In general, the expression manager 414 allows a large number of geometries to be controlled by a relatively small number of control parameters. In one arrangement, the expression manager 414 provides one or more high level adjustable control parameters that drive the control parameters of associated blendshapes and corrective shapes. For example, high level adjustable control parameters may be provided for particular facial features or portions of a character's face. As such, a high level control for a character's mouth, eyebrows, forehead, etc. may be provided for user adjustments. Individual muscles and muscle groups may also be assigned one or more high level control parameters for adjusting muscle geometries to produce a variety of expressions. In some arrangements, control parameters may be assigned for controlling the movement of one or multiple surfaces such as character surfaces (e.g., skin, flesh, etc.), articles associated with a character (e.g., clothing) or other similar movable surfaces. In still other arrangements, the control parameters may be assigned to controlling the movement of structures associated with the character. For example, the movements of joints (e.g., shoulder, wrist, elbow, knee, etc.) may be assigned to one or more control parameters. Character emotions are still another basis for a high level control parameter that may be used to drive individual blendshapes and corrective shapes associated with individual expressions or combinations of expressions. For example, one high level control parameter may be associated with different levels of the emotion happiness and used to drive control parameters of various geometries to provide a range of expressions of happiness.

Along with applying corrective shapes to the geometry of a character being developed, information associated with the corrective shapes may be stored for later retrieval and reapplication. For example, a modeler may apply a corrective shape to the nose of a character that has been dialed up (with a high level control) to express an emotion of extreme happiness. Upon being applied, the corrective shape may be stored in the storage unit 404 along with the blendshapes to which the corrective shape has been applied. Information is also stored that records this association between the corrective shape and the blendshapes. For example, data may be stored in a shape database 416 that represents the application of the corrective shape to the blendshapes for providing an appropriate geometry of a character nose for an expression of extreme happiness. As such, the corrective shape may be retrieved and applied to the blendshapes for each instance of the character being dialed up to present an emotion of happiness. Thus, application of a corrective shape is initiated by use of a high level control to dial a character to an expression. Furthermore, along with initiating the application of a corrective shape, the high level control may trigger adjustments to the corrective shape. Continuing with the example, the corrective shape may be retrieved and applied based on the high level control being dialed to a value associated with an emotion of extreme happiness. Correspondingly, as the high level control is used to reduce the happiness level being expressed, the geometry of the corrective shape may be adjusted such that the character's nose is adjusted for this expression of reduced happiness.

Figure 5:
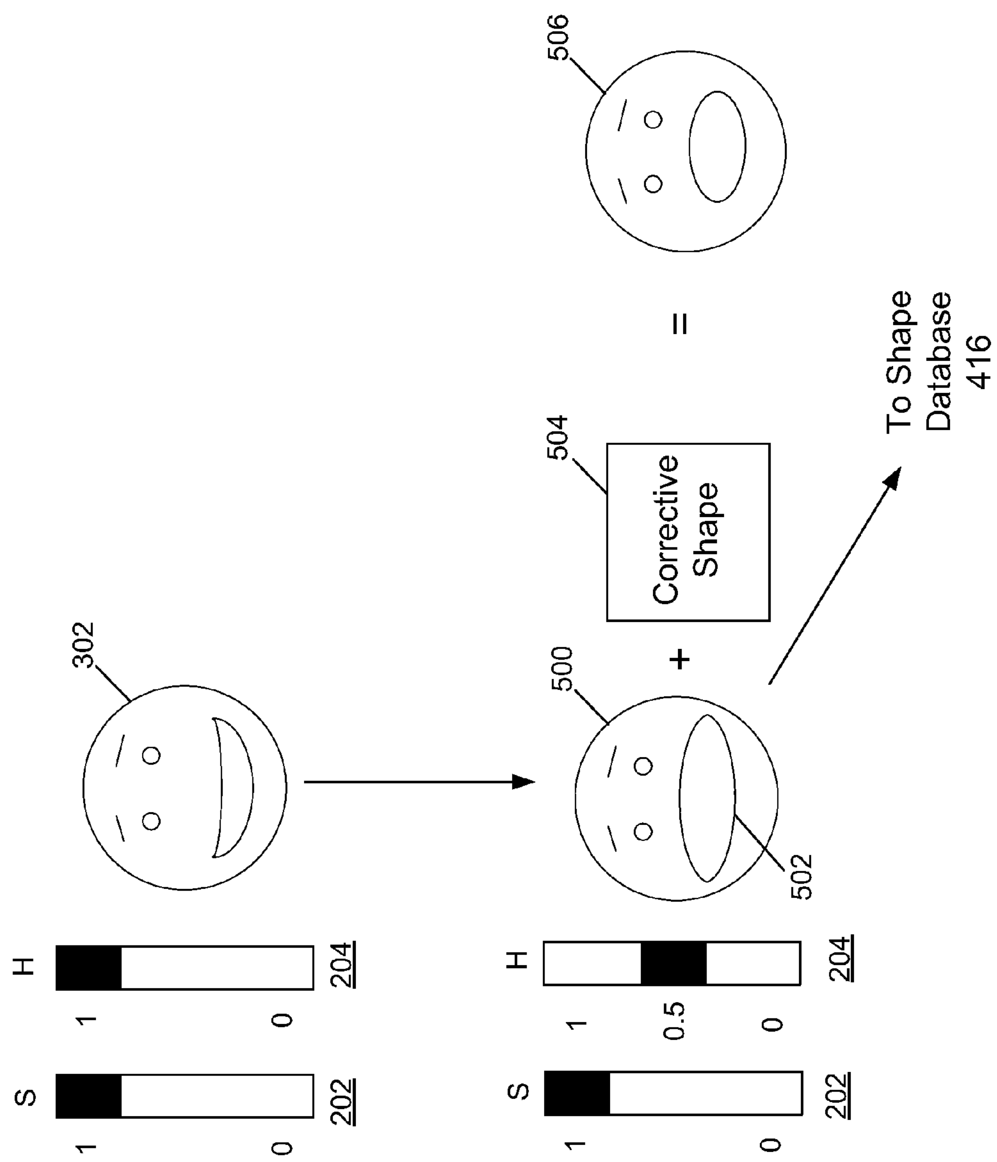
FIGS. 5-7 illustrate applying corrective elements.

Referring to FIG. 5, information may be also be stored for applying one or more corrective shapes to a combination of blendshapes. As illustrated in FIG. 3, the corrective shape 300 is applied to a combination of blendshapes to produce the facial expression 302 to appropriately represent combined emotions of happiness and surprise. By storing the corrective shape 300 (e.g., in the storage device 404), the expression manager 414 can initiate retrieving and applying the corrective shape to the combined blendshape for each instance of reproducing the expression. For example, whenever the sliders 202 and 204 are adjusted to values of one, the corrective shape is retrieved and applied to the combination of blendshapes to produce the facial expression 302.

In a similar manner, additional corrective shapes may be applied to a combination of blendshapes for other expressions (and stored for latter retrieval and application). For example, upon the slider 204 being adjusted such that the happiness control parameter has a value of 0.5, the combined blendshape provides a facial expression 500. Due to the application of the corrective shape 300, in this instance, the expression 500 may be unrealistic. In this particular example, a facial feature 502 that represents the mouth of the character is abnormally large and elongated. To adjust the size and geometry of the facial feature 502, another corrective shape 504 is applied to produce a more realistic facial expression 506. With the introduction of the corrective shape 504, the corrective shape 300 compensates (e.g., adjusts deltas) to account for the second corrective shape. Such compensations allow the facial expression 302 to be returned when the happiness control parameter is dialed up (via the slider 204) to a value of one. Thus, during such control parameter adjustments (for dialing up facial expressions), the corrective shapes correspondingly adjust. For example, a parameter (e.g., a numerical value) that represents the geometry of the second corrective shape 504 may change correspondingly with the control parameters (being adjusted via the sliders 202, 204, etc.). Alternatively, the parameter associated with the second corrective shape 504 may be affected by control parameter adjustments. For example, as the happiness control parameter is dialed down (via the slider 204) from the value of 0.5 to zero, the parameter associated with second corrective shape 504 may adjust from a value of one to zero. However, as the control parameter is dial up (via the slider 204) from the value of 0.5 to one, the parameter associated with the second corrective shape 503 may retain a value of one.

One or more techniques may be implemented to produce the corrective shape 504, for example, a modeler may electronically sculpt the facial expression 506 from the abnormal facial expression 500 to produce the corrective shape 504. The character development system 400 may also detect the differences between the facial expressions 500 and 110 and produce the corrective shape in an automatic manner. For example, a facial expression that defines a boundary of a blendshape may be identified by the system 400. Upon an expression of the blendshape being reproduced due to a particular control parameter setting being detected (e.g., the surprise control parameter set to one and the happiness control parameter being set to zero), one or more corrective shapes are applied.

Along with applying the corrective shape 504, the corrective shape manager 412 also initiates information being stored (e.g., in the storage unit 404) that represents the corrective shape and the association of the corrective shape with the blendshapes (and possibly other corrective shapes) being adjusted. For example, information representative of the control parameter settings may be stored in the shape database 416 such that upon the settings being detected at another time (from the sliders 202, 204), the corrective shape 504 is retrieved and applied to the combination of blendshapes. Furthermore, the applied geometry of the corrective shape 504 may be adjusted as the control parameter settings are adjusted. For example, if the happiness control parameter is slightly increased, the corrective shape 504 is adjusted such that a proportional level of happiness appears in the facial expression 506. As such, one or more corrective shapes may be applied and adjusted based upon control parameters associated with two emotions (e.g., surprise and happiness).

Figure 6:
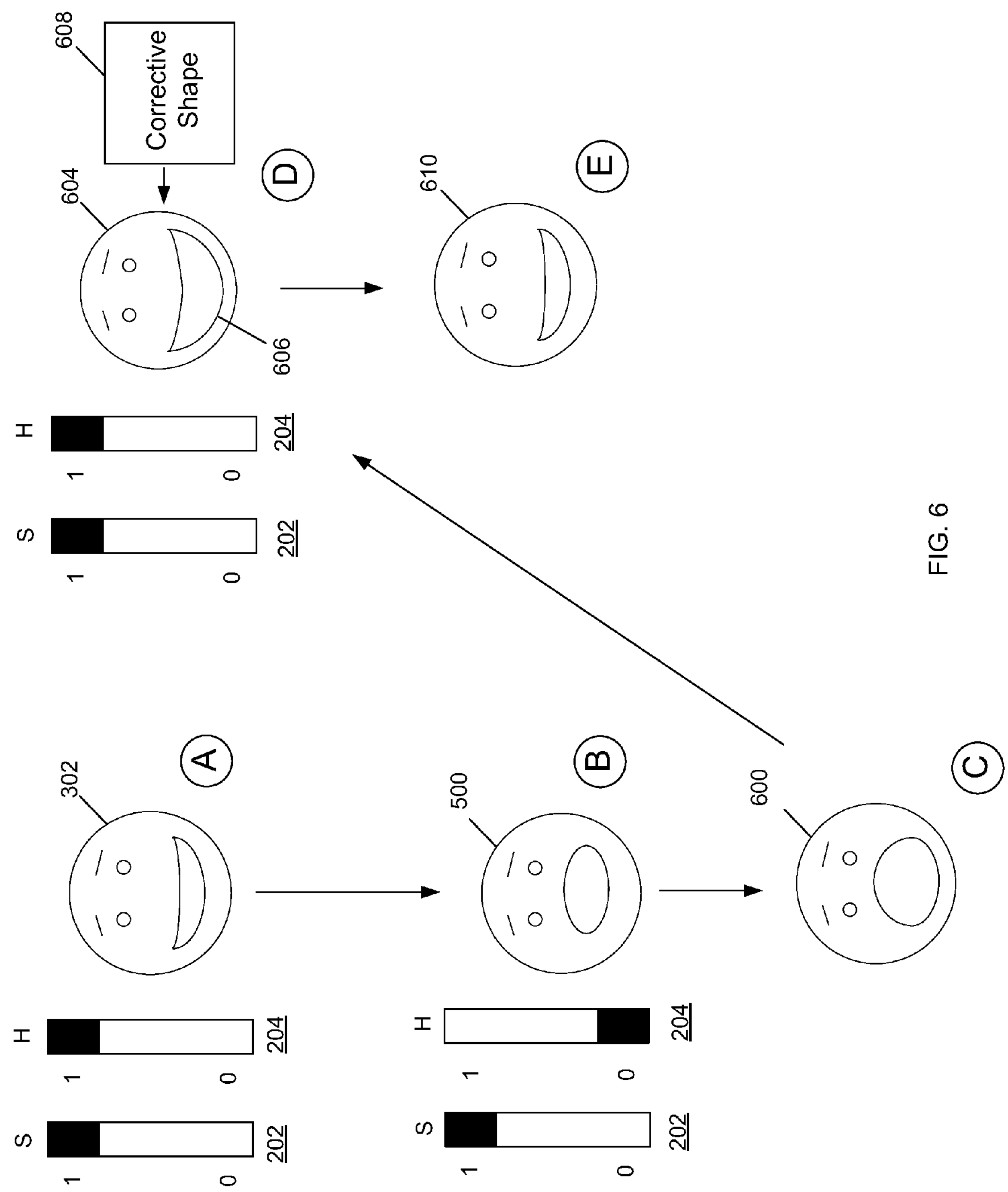

Referring to FIG. 6, other methodologies and techniques may be applied to reduce geometry interference along with the amount of user interaction needed to set control parameters for adjusting character expressions. For example, one or more facial expressions may be constrained to appear substantially constant for each selected instance. As such, upon returning to a facial expression selected to be invariant, face geometries are returned to reproduce the invariant expression. For example, as shown in step A, the sliders 202 and 204 may be fully dialed (to values of one) to produce the expression 302 of combined emotions of happiness and surprise. As shown in FIG. 5, and shown here in step B, the slider 204 (associated with happiness) is set to a zero value, thereby returning the animated face to the recognizable expression 506 (e.g., by applying the corrective shape 504), as shown in step B.

As mentioned, one or more facial features may be adjusted to alter the expression being represented. For example, features (e.g., the mouth) may be electronically sculpted to redefine the expression of surprise. As illustrated in an expression 600, the shape of a feature 602 is adjusted such that the represented mouth is opened wider for expressing surprise, as shown in step C.

In this example, the combined expression of happiness and surprise 302 (i.e., in which sliders 202 and 204 are set to values of one) is selected as an invariant expression. As such, upon returning the sliders to control parameter values of one, the invariant expression is reproduced. For example, in step D, the slider 204 associated with the happiness control parameter is dialed back to a value of one to return to the invariant expression. However, due to the re-sculpting to produce the surprise facial expression 600, additional geometry interferences may appear as the control parameter (associated with slider 204) is adjusted back to a value of one. For example, the re-sculpturing may result in an expression 604 that is not equivalent to the invariant expression 302. Due to the geometry interference, an abnormally large and disproportionate mouth 606 is present in the expression 604.

To return the expression 604 to an expression equivalent to the invariant expression 302, one more techniques may be implemented. For example, once the expression manager 414 detects that the expression 604 differs from the invariant expression 302, another corrective shape 608 (or multiple corrective shapes) may be applied to the expression 604 to reproduce the invariant expression 302. Once produced by the corrective shape manager 412, the corrective shape 608 is applied to the expression 604 to produce an expression 610 that is substantially equivalent to the expression 302 (shown in step E). Typically production and application of the corrective shape (e.g., corrective shape 604) or corrective shapes is executed independent of input from a modeler or animator. As such, the production and application of the corrective shape 608 is controlled by adjusting the expression control parameters associated with the sliders 202 and 204 without additional user input and without increasing the amount of user controls needed to adjust the corrective shapes and the facial expressions. However, in some implementations, additional user input is used for corrective element (e.g., corrective shape) production and application.

Along with adding one or more corrective shapes to assure returning to an invariant expression, other techniques may be implemented. For example, operations may be initiated for modifying and/or deleting existing corrective shapes individually or in combination. Further, multiple expressions may be selected as invariant expressions. For example, the expression 506, which corresponds to the happiness control parameter being set to zero (via slider 204) and the surprise control parameter being set to one (via slider 202), may be defined as another invariant expression. As such, upon dialing up the control parameters (e.g., happiness control parameter set to zero and surprise control parameter set to one) on the sliders 202, 204, previously produced corrective shapes (e.g., corrective shape 504) or newly created corrective shapes may be used for returning to the invariant expression 506. An expression that includes expressions of multiple blendshapes may also be defined as an invariant expression. For example, dialing a value of 0.2 on slider 204 (i.e., 20% happiness control parameter) and 0.5 on slider 202 (i.e., 50% surprise control parameter) may be selected as an invariant expression. As such, upon these values being set with the sliders 202, 204, one or more corrective shapes (if needed) may be applied to ensure the invariant expression is produced.

Invariant expressions may also be defined from uniquely created expressions (e.g., electronically sculpted). For example, a modeler may produce one or a series of facial expressions of a character and define one or more control parameters for adjusting the expressions. Upon the control parameters being adjusted to settings that correspond to one of the sculpted expressions, one or more corrective shapes are applied to return the character to the invariant expression.

For situations in which multiple invariant expressions are defined, one or more techniques may be implemented for producing expressions that reside between invariant expressions. For example, one or more estimation techniques (e.g., interpolation, a least-squares estimation procedure) may be implemented for adjusting geometries (e.g., vertex positions) and corrective shapes for expressions between two invariant expressions. In some arrangements, selected invariant expressions may represent extreme emotions. For example, one invariant expression may represent a state of extreme happiness of the character and another invariant may be an extreme expression of surprise or other type of emotion. Upon adjusting control parameters, one or more interpolation techniques may be used to calculate a corresponding expression that lies between the two extreme expressions.

Figure 7:
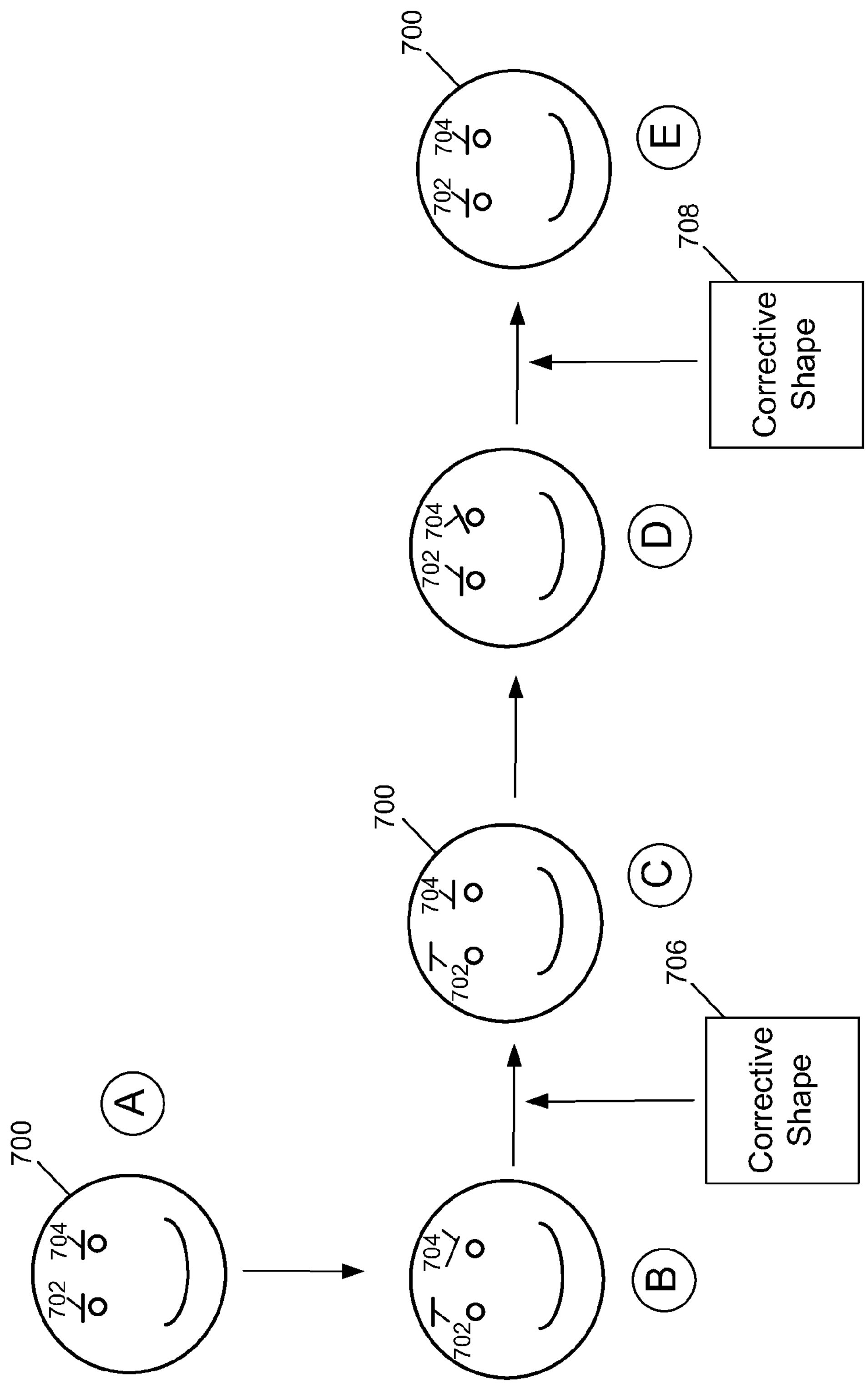

Referring to FIG. 7, features (or portions) of a facial expression may be selected for independent geometry adjustments. As such, the character development system 400 allows a feature geometry (e.g., an eyebrow) to be adjusted without causing the geometries of other features to change. In this example, a character expression 700 includes a right eyebrow 702 (presented in the figure to the view's left) that may be selected by a user (e.g., a modeler). The facial expression 700 also includes a left eyebrow 704 (presented in the figured to the view's right). Based upon the user, the geometry and position of the eyebrow 702 may be adjusted for providing different facial expressions. For example, as represented in step A, both the right eyebrow 702 and the left eyebrow 704 are oriented substantially horizontal and located relatively near the respective left and right eyes. By the user selecting the right eyebrow 702, the geometry and position of the eyebrow may be adjusted for creating various expressions. To control movement, a control parameter may be assigned to the right eyebrow (e.g., a slider) for raising and lowering the eyebrow. However, raising and lowering the eyebrow 702 may effect other portions and features of the expression 700. For example, the orientation, geometry and position of the left eyebrow 704 may be effected by the independent movements of the right eyebrow 702. To reduce such interference, corrective shapes may be applied to features and portions of the character face such as the left eyebrow 704. As such, a portion of the character face 700 may be considered invariant and one or more corrective shapes may be implemented by the corrective shape manager 412 for geometry retention.

In this scenario, the right eyebrow 702 is selected for being moved independently with a parameter control, however, one or more features or portions of the character may be joined to the selected feature (e.g., the eyebrow 702). For example, the left eyebrow 704 may be joined to the right eyebrow 702, and together the two features may be assigned to a control parameter for adjusting movement of both features.

As shown in step B, by setting the control parameter, the right eyebrow 702 is illustrated as being raised while remaining substantially horizontal in orientation. Based upon the movement of the right eyebrow 702, the left eyebrow 704 is moved and changes orientation from horizontal to slanted. The movement of the left eyebrow 704 is detected by the expression manager 414 and one or more corrective shapes (represented as a corrective shape 706) are applied (in step C) by the corrective shape manager 412 for adjusting the left eyebrow 704 back to a horizontal orientation and position as shown in step A (to counteract the effects of the right eyebrow 704 movement).

Based upon the application of the corrective shape 706, upon moving the right eyebrow 702, portions of the expression 700 may be effected. For example, as illustrated in step D, upon returning the right eyebrow 702 to the original position (shown in step A), the left eyebrow 704 is again moved from the horizontal orientation to a slanted orientation. However, by defining the expression 700 shown in step A as invariant, the expression manager 414 detects the movement of eyebrow 704 and returns the eyebrow 704 to an orientation to reproduce the invariant expression. To provide this adjustment, another corrective shape 708 is applied to the character face 700 such that the expression shown in step E is equivalent to the expression 700 of step A. However, in some situations, other corrective shape adjustments may be executed, for example, with or without adding another corrective shape, one or more corrective shapes may be deleted or adjusted individually or in combination. As such, individual features and portions of a character face may be moved independently or jointly (e.g., by assigning one or more control parameters) to reduce the amount of user input needed to expression adjustments. Furthermore, by defining one or more invariant expressions or invariant features of a character face, adjustments may be implemented (e.g., adding one or more corrective shapes) to appropriately return the character to the proper invariant expression.

Figure 8:
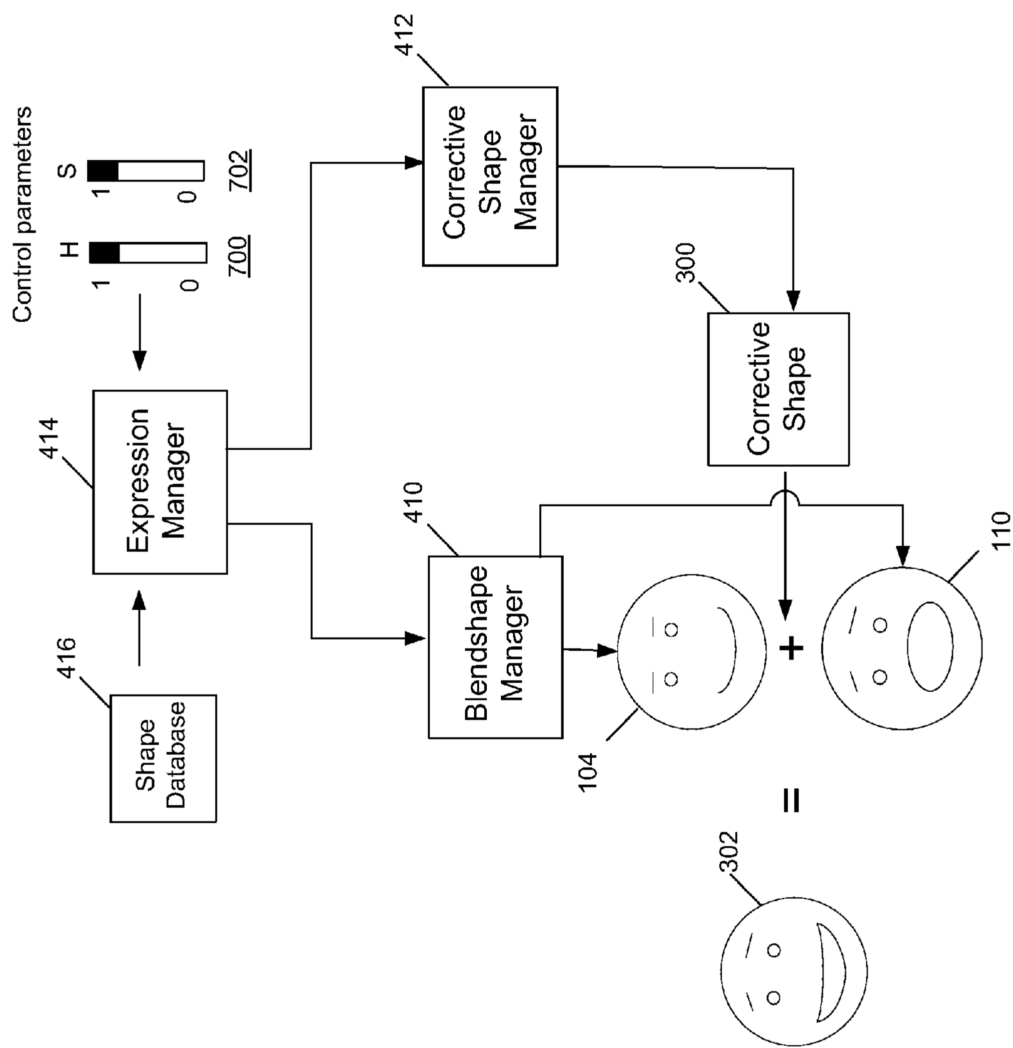
FIG. 8 illustrates operations of an expression manager, a blendshape manager and a corrective element manager.

Referring to FIG. 8, exemplary interactions among the expression manager 414, the corrective shape manager 412 and the blendshape manager 410 demonstrate the reduced user interaction needed for adjusting facial expressions of an animated character. In this example, two blendshapes are combined, in which each blendshape represents ranges of different emotions. One blendshape provides a range of expressions associated with the emotion of happiness and the other blendshape provides expressions associated with the emotion of surprise. To select among the expressions, sliders 800, 802 are respectively assigned to each blendshape by the expression manager 414. Similar to the sliders 202 and 204 (shown in FIG. 6), a user may adjust the sliders 800, 802 individually or in combination for dialing up expressions of interest. As such, a user (e.g., a modeler, an animator, etc.) can select expressions without being aware of the creation and adjustments of corrective shapes to adjust expressions. Further, by one or more expressions being identified as invariant, corrective shapes may be created and adjusted (without user awareness) such that the invariant expressions are consistently recreated upon being selected (e.g., by dialing the appropriate slider or sliders). In this arrangement data from the shape database 416 identifies one or more invariant expressions (or invariant facial features) to the expression manager 414.

Upon the sliders 800, 802 being set for selecting an expression from the range of emotions, data representative of the control parameters is sent to the blendshape manager 410 for retrieving the appropriate blendshape or blendshapes and adjusting corresponding geometries to present the emotional expression of interest. In this example, due to the selected control parameter values (e.g., a values of one for both the happiness control parameter and the surprise control parameter), the blendshapes 100 and 106 are retrieved from the storage device 404 and respectively adjusted to produce the expressions 104 and 110. Additionally, the blendshape manager 414 combines the expressions 104, 110 to produce the expression of interest. Similar to the example shown in FIG. 6, this particular combination for blendshapes 104, 110 has been defined as an invariant expression and is thereby actively adjusted to return to the original expression.

Upon detecting that the selected values of the control parameters (as provided by the sliders 800, 802), the expression manager 414 provides data to the corrective shape manager 412 to initiate the creation of one or more appropriate corrective shapes for being applied to the combination of blendshape expressions 104 and 110. In this particular example the corrective shape 300 is produced by the corrective shape manager 412 (e.g., created, retrieved from the storage device 404, etc.) and applied to the combination of blendshape expressions to produce the invariant expression 302. As such, by operating just two control parameters (via the sliders 800, 802), blendshape expressions are selected and combined. Additionally, a corrective shape is produced and applied to the combined expressions to provide an appropriate and realistic expression.

Figure 9:
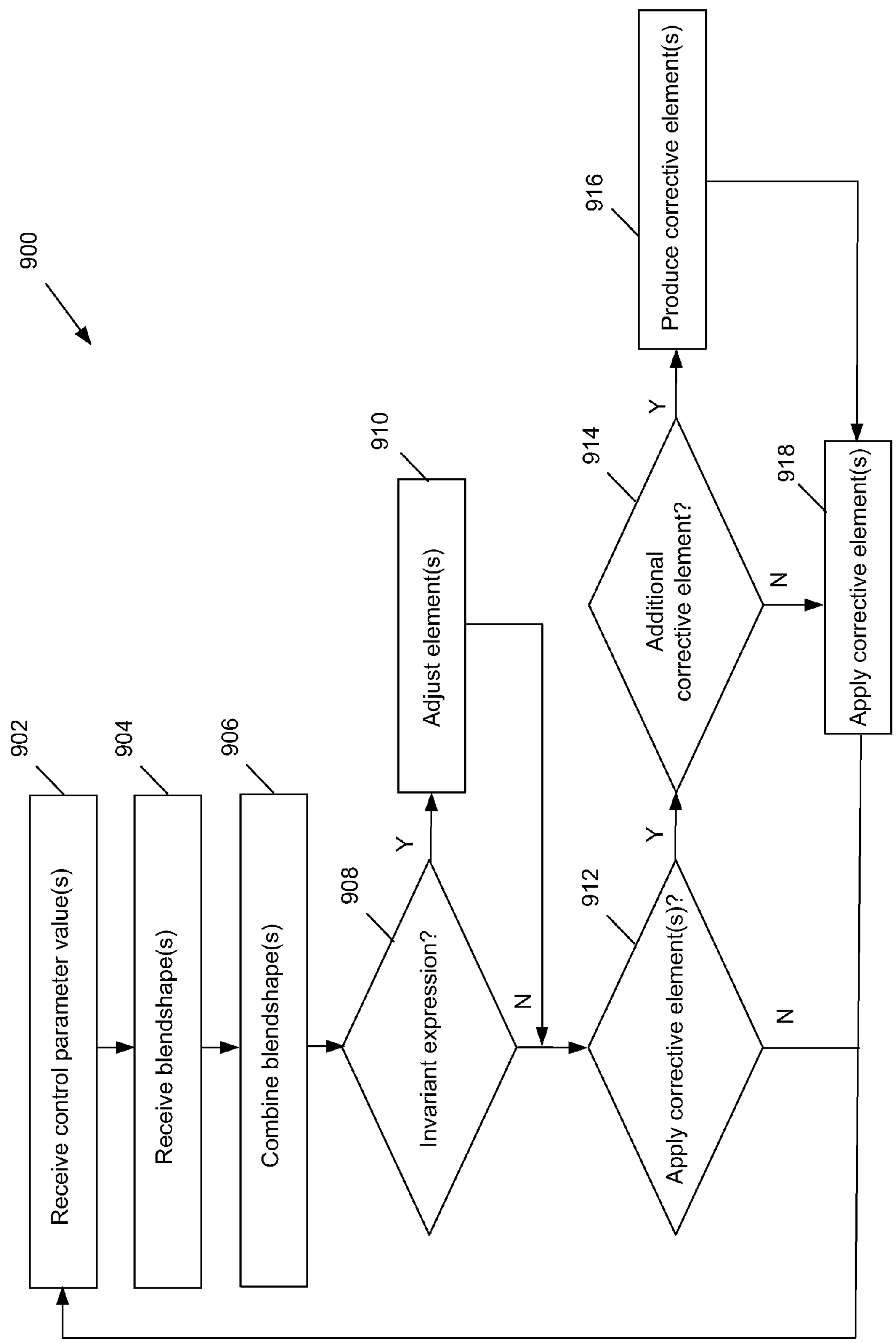
FIG. 9 is a flowchart of operations of an expression manager, a blendshape manager and a corrective element manager.

Referring to FIG. 9, a flowchart 900 represents some of the operations of the expression manager 414, the blendshape manager 410 and a corrective element manager (such as the corrective shape manager 412). The operations may be executed by a single computer system (e.g., computer system 402) or multiple computing devices. Along with being executed at a single site (e.g., at one computer system), operation execution may be distributed among two or more sites.

Operations include receiving 902 one or more values representative of one or more corresponding control parameters. For example, interface devices (e.g., sliders 800, 802) may be used for selecting values that represent facial expressions within a range of expressions representing an emotion. Rather than emotions, the control parameters values may represent the position, orientation and movement of muscles or muscle groups, facial features (e.g., character mouth, nose, etc.) or other portions of an animated character (e.g., surfaces such as skin, flesh, clothing, etc.). Operations also include receiving 904 blendshapes (e.g., from the storage device 404) and combining 906 the blendshapes based upon the values of the control parameters. In some implementations, blendshape retrieval and combining is provided by the blendshape manager 410, however, such operations may be executed by the expression manager 414 or the corrective shape manager 412 individually or in any combination with the blendshape manager 410.

Operations also include determining 908 if the selected expression (as provided by the control parameter values) is associated with a previously defined invariant expression such as illustrated with expression 302 in FIG. 6. If identified as invariant, operations include adjusting 910 elements such as geometries such as blendshapes and facial features to return the character facial expression to the invariant expression. Interpolation techniques may also be implemented for geometry adjustments. For example, based upon the selected control parameter values, an expression may be interpolated from one or more invariant expressions.

Upon adjusting geometries to account for one or more invariant expressions, or if not needing to account for an invariant expression, operations include determining 912 if application of one or more corrective elements (e.g., corrective shapes) is needed. For example, based upon the control parameter values, one or more instances of blendshape interference may occur and call for at least one corrective shape being applied. Operations also include determining 914 if one or more corrective elements (e.g., corrective shapes) need to be created to reduce blendshape interference or whether the current corrective element or elements may be used and accordingly adjusted to reduce interference. If needed, operations include producing 916 one or more corrective elements (e.g., corrective shapes) to substantially reduce interference. Upon producing additional corrective elements or determining that additional corrective elements are not needed, operations include applying 918 the corrective elements (e.g., corrective shapes). Generally, the corrective shape manager 412 executes operations for producing and applying corrective shapes, however, in some implementations such operations may be executed individually or in combination with the expression manager 414, the blendshape manager 410 or other type of process.

To perform the operations described in flow chart 900, the expression manager 414, the blendshape manager 410 and the corrective shape manager 412, individually or in combination, may perform any of the computer-implement methods described previously, according to one implementation. For example, a computer system such as computer system 402 (shown in FIG. 4) may execute the expression manager 414. The computer system may include a processor (not shown), a memory (not shown), a storage device (e.g., storage device 404), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the computer system. In one implementation, the memory is a computer-readable medium. In one implementation, the memory is a volatile memory unit. In another implementation, the memory is a non-volatile memory unit.

The storage device is capable of providing mass storage for the computer system. In one implementation, the storage device is a computer-readable medium. In various different implementations, the storage device may be a floppy disk device, a hard disk device, an optical disk device, or a tape device.

The input/output device provides input/output operations for the computer system. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:

combining, by a processor, a first blendshape and a second blendshape of an animated character, wherein a first control parameter is capable of adjusting the first blendshape and a second control parameter is capable of adjusting the second blendshape; and applying at least a first corrective element to the combined first blendshape and second blendshape, to reduce blendshape interference, based upon at least one of the first control parameter and the second control parameter.

2. The computer-implemented method of claim 1, wherein applying the first corrective element includes producing the first corrective element to adjust the combined first blendshape and second blendshape.

3. The computer-implemented method of claim 1, wherein applying the first corrective element includes adjusting the geometry of the animated character.

4. The computer-implemented method of claim 1, wherein applying the first corrective element includes adjusting a non-geometrical feature of the animated character.

5. The computer-implemented method of claim 1, wherein applying the first corrective element includes returning the animated character to a predefined facial expression.

6. The computer-implemented method of claim 1, wherein applying the first corrective element includes applying the first corrective shape to a first feature of the combined first and second blendshape independent of a second feature of the combined first and second blendshape.

7. The computer-implemented method of claim 1, further comprising:

applying at least a second corrective element to the combined first blendshape and second blendshape based upon at least one of the first control parameter and the second control parameter.

8. The computer-implemented method of claim 7, wherein applying the at least second corrective shape includes returning the animated character to a predefined facial expression.

9. The computer-implemented method of claim 1, wherein values of the first control parameter are representative of a range of facial expressions of the animated character.

10. The computer-implemented method of claim 1, wherein values of the first control parameter are representative of a range of muscular movements of the animated character.

11. The computer-implemented method of claim 1, wherein values of the first control parameter are representative of a range of simulated movements of a surface of the animated character.

12. The computer-implemented method of claim 1, wherein values of the first control parameter are representative of a range of movements of at least one joint of the animated character.

13. The computer-implemented method of claim 1, wherein applying the first corrective element to the combined first blendshape and second blendshape is based upon user input.

14. A system comprising:

a computing device comprising:

a processor; and an expression manager for adjusting a first control parameter of a first blendshape and a second control parameter of a second blendshape to adjust an expression of an animated character;

a blendshape manager for combining the first blendshape and the second blendshape of the animated character; and a corrective element manager for applying at least a first corrective element to the combined first blendshape and second blendshape, to reduce blendshape interference, based upon at least one of the first control parameter and the second control parameter.

15. The system of claim 14, wherein the corrective element manager is configured to produce at least one corrective element to adjust the combined first blendshape and second blendshape.

16. The system of claim 14, wherein the first corrective element is configured to adjust the geometry of the animated character.

17. The system of claim 14, wherein the first corrective element is configured to adjust a non-geometrical feature of the animated character.

18. The system of claim 14, wherein the first corrective element returns the animated character to a predefined facial expression.

19. The system of claim 14, wherein the corrective element manager is configured to apply the first corrective element to a first feature of the combined first and second blendshape independent of a second feature of the combined first and second blendshape.

20. The system of claim 14, wherein the corrective element manager is configured to apply at least a second corrective shape to the combined first blendshape and second blendshape based upon at least one of the first control parameter and the second control parameter.

21. The system of claim 20, wherein application of the at least second corrective shape returns the animated character to a predefined facial expression.

22. The system of claim 14, wherein values of the first control parameter are representative of a range of facial expressions of the animated character.

23. The system of claim 14, wherein values of the first control parameter are representative of a range of muscular movements of the animated character.

24. The system of claim 14, wherein values of the first control parameter are representative of a range of simulated movements of a surface of the animated character.

25. The system of claim 14, wherein values of the first control parameter are representative of a range of movements of at least one joint of the animated character.

26. The system of claim 14, wherein the corrective element manager is configured to receive user input for applying the first corrective element.

27. A computer program product tangibly embodied in a storage device and comprising instructions that when executed by a processor perform a method comprising:

combining a first blendshape and a second blendshape of an animated character, wherein a first control parameter is capable of adjusting the first blendshape and a second control parameter is capable of adjusting the second blendshape; and applying at least a first corrective element to the combined first blendshape and second blendshape, to reduce blendshape interference, based upon at least one of the first control parameter and the second control parameter.

28. The computer program product of claim 27, wherein applying the first corrective element includes producing the first corrective element to adjust the combined first blendshape and second blendshape.

29. The computer program product of claim 27, wherein applying the first corrective element includes adjusting the geometry of the animated character.

30. The computer program product of claim 27, wherein applying the first corrective element includes adjusting a non-geometrical feature of the animated character.

31. The computer program product of claim 27, wherein applying the first corrective element includes returning the animated character to a predefined facial expression.

32. The computer program product of claim 27, wherein applying the first corrective element includes applying the first corrective shape to a first feature of the combined first and second blendshape independent of a second feature of the combined first and second blendshape.

33. The computer program product of claim 27, wherein the method further comprises:

applying at least a second corrective element to the combined first blendshape and second blendshape based upon at least one of the first control parameter and the second control parameter.

34. The computer program product of claim 33, wherein applying the at least second corrective shape includes returning the animated character to a predefined facial expression.

35. The computer program product of claim 27, wherein values of the first control parameter are representative of a range of facial expressions of the animated character.

36. The computer program product of claim 27, wherein values of the first control parameter are representative of a range of muscular movements of the animated character.

37. The computer program product of claim 27, wherein values of the first control parameter are representative of a range of simulated movements of a surface of the animated character.

38. The computer program product of claim 27, wherein values of the first control parameter are representative of a range of movements of at least one joint of the animated character.

39. The computer program product of claim 27, wherein applying the first corrective element to the combined first blendshape and second blendshape is based upon user input.

40. A system comprising:

a computer system capable of representing at least one animated character, the computer system including, a blendshape manager for combining a plurality of blendshapes to produce the animated character, an expression manager for respectively adjusting at least one control parameter associated with each of the plurality of blendshapes to adjust an expression of the animated character, and a corrective element manager for applying at least one corrective element to the combined plurality of blendshapes, to reduce blendshape interference, based upon at least a first control parameter, the applied corrective element being adjustable based upon at least a second control parameter absent the introduction of one or more additional control parameters.

41. The system of claim 40, wherein the at least one applied corrective element returns the animated character to a predefined facial expression.

42. The system of claim 40, wherein the at least one applied corrective element adjusts the geometry of the animated character.

43. The system of claim 40, wherein the at least on applied corrective element adjusts a non-geometrical feature of the animated character.

* * * * *

UNITED STATES PATENT AND TRADEMARK OFFICE

CERTIFICATE OF CORRECTION

PATENT NO. : 8,207,971 B1
APPLICATION NO. : 12/388806
DATED : June 26, 2012
INVENTOR(S) : Michael Koperwas It is certified that error appears in the above-identified patent and that said Letters Patent is hereby corrected as shown below:

In Column 18, Line 1, In Claim 43, delete “on” and insert -- one --

Signed and Sealed this
Fourteenth Day of August, 2012

David J. Kappos
*Director of the United States Patent and Trademark Office*